US009837037B2

(12) United States Patent
Hwang et al.

(10) Patent No.: US 9,837,037 B2
(45) Date of Patent: Dec. 5, 2017

(54) METHOD OF DRIVING DISPLAY PANEL AND DISPLAY APPARATUS FOR PERFORMING THE SAME

(71) Applicant: SAMSUNG DISPLAY CO., LTD., Yongin, Gyeonggi-Do (KR)

(72) Inventors: Hyun Sik Hwang, Hwaseong-si (KR); Bong-Im Park, Asan-si (KR); Ik Hyun Ahn, Hwaseong-si (KR); Won-Sik Oh, Seoul (KR); Yoon-Gu Kim, Seoul (KR); Ho-Seok Son, Anyang-si (KR); Young-Woo Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 112 days.

(21) Appl. No.: 14/702,597

(22) Filed: May 1, 2015

(65) Prior Publication Data

US 2016/0104445 A1 Apr. 14, 2016

(30) Foreign Application Priority Data

Oct. 13, 2014 (KR) ........................ 10-2014-0137888

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.

CPC ......... *G09G 3/3688* (2013.01); *G09G 3/3648* (2013.01); *G09G 3/3614* (2013.01);

(Continued)

(58) Field of Classification Search

CPC .. G09G 3/3688; G09G 3/3648; G09G 3/3614; G09G 2340/16; G09G 2320/103;

(Continued)

(56) References Cited

U.S. PATENT DOCUMENTS

| | | | | |
|---|---|---|---|---|
| 8,711,079 B2 * | 4/2014 | Lee | ...................... | G09G 3/3688 345/100 |
| 2006/0262069 A1 * | 11/2006 | Do | ...................... | G09G 3/3688 345/98 |

(Continued)

FOREIGN PATENT DOCUMENTS

| | | |
|---|---|---|
| KR | 10-2003-0076756 A | 9/2003 |
| KR | 10-0510811 B1 | 8/2005 |
| KR | 10-2009-0041494 A | 4/2009 |

OTHER PUBLICATIONS

Korean Patent Abstracts Publication No. KR 10-2003-0010572 A, dated Feb. 5, 2003, for KR 10-0510811 B1, 1 page.

*Primary Examiner* — Ilana Spar
*Assistant Examiner* — Brent D Castiaux
(74) *Attorney, Agent, or Firm* — Lewis Roca Rothgerber Christie LLP

(57) ABSTRACT

A method of driving a display panel includes comparing a previous line data and a present line data to generate a charge sharing enable (EQ) signal indicating whether or not a charge sharing is to be applied to a pixel; selectively applying the charge sharing to the present line data utilizing a charge sharing voltage according to the EQ signal to generate a data voltage; and outputting the data voltage to the pixel.

20 Claims, 6 Drawing Sheets

(52) U.S. Cl.
CPC ................. *G09G 2310/027* (2013.01); *G09G 2310/0248* (2013.01); *G09G 2320/103* (2013.01); *G09G 2330/021* (2013.01); *G09G 2330/045* (2013.01); *G09G 2340/16* (2013.01)

(58) Field of Classification Search
CPC ..... G09G 2310/027; G09G 2310/0248; G09G 2330/045; G09G 2330/021
See application file for complete search history.

(56) References Cited

U.S. PATENT DOCUMENTS

| | | | | |
|---|---|---|---|---|
| 2010/0188374 | A1* | 7/2010 | Chen | G09G 3/3614 345/204 |
| 2011/0310080 | A1* | 12/2011 | Tonomura | G09G 3/3688 345/211 |
| 2011/0316823 | A1* | 12/2011 | Otani | G09G 3/3688 345/204 |
| 2013/0076722 | A1 | 3/2013 | Choi et al. | |
| 2013/0083093 | A1* | 4/2013 | Kim | G09G 3/3275 345/690 |
| 2013/0120349 | A1* | 5/2013 | Oh | G09G 3/3685 345/212 |
| 2013/0169616 | A1 | 7/2013 | Kim et al. | |
| 2014/0071188 | A1* | 3/2014 | Oh | G09G 3/3696 345/691 |
| 2014/0320464 | A1* | 10/2014 | Ryu | G09G 3/3688 345/204 |
| 2015/0015473 | A1* | 1/2015 | Jung | G09G 3/3688 345/98 |
| 2015/0103065 | A1* | 4/2015 | Kim | G09G 3/3614 345/212 |

* cited by examiner

FIG. 6
FIG. 7
SOL
CONFIG + EQ
PIXEL DATA
HBP
SOL
CONFIG
PIXEL DATA + EQ
HBP

METHOD OF DRIVING DISPLAY PANEL AND DISPLAY APPARATUS FOR PERFORMING THE SAME

CROSS-REFERENCE TO RELATED APPLICATION

This application claims priority to and the benefit of Korean Patent Application No. 10-2014-0137888, filed on Oct. 13, 2014, in the Korean Intellectual Property Office KIPO, the content of which is herein incorporated by reference in its entirety.

BACKGROUND

1. Field

Example embodiments of the present invention relate to a method of driving a display panel and a display apparatus for performing the method.

2. Description of the Related Art

Generally, a display apparatus includes a display panel displaying an image and a panel driver driving the display panel. The panel driver includes a timing controller, a gate driver and a data driver. The data driver outputs data signals to the display panel.

Differences of the data signals between adjacent pixels may be high when the data signal swings between a high level and a low level to display a specific image pattern. When the differences of the data signals between adjacent pixels are high, power consumption of the display apparatus may increase and heat may be generated by the data driver.

In addition, when the differences of the data signals between adjacent pixels are high, a charging rate of a pixel voltage may not be sufficient so that display quality of the display panel may be deteriorated.

SUMMARY

Aspects of example embodiments of the present invention relate to a method of driving a display panel and a display apparatus for performing the method. For example, example embodiments of the present invention relate to a method of driving a display panel for reducing power consumption and heat and improving display quality and a display apparatus for performing the method.

Aspects of example embodiments of the present invention provide a method of driving a display panel capable of reducing power consumption and heat and improving display quality.

Aspects of example embodiments of the present invention also provide a display apparatus for performing the above-mentioned method.

In an example embodiment of the present invention, a method of driving a display panel includes comparing a previous line data and a present line data to generate a charge sharing enable (EQ) signal indicating whether or not a charge sharing is to be applied to a pixel; selectively applying the charge sharing to the present line data utilizing a charge sharing voltage according to the EQ signal to generate a data voltage; and outputting the data voltage to the pixel.

The method may further include applying the charge sharing to the present line data in response to one of the previous line data and the present line data being less than the charge sharing voltage and another of the previous line data and the present line data being greater than the charge sharing voltage.

The method may further include applying the charge sharing to the present line data in response to a difference between the previous line data and the present line data being equal to or greater than a half of a difference between a maximum pixel voltage and a minimum pixel voltage.

The charge sharing voltage may be an average of a maximum pixel voltage and a minimum pixel voltage.

When an analog power voltage applied to a data driver is AVDD and a polarity of the pixel is positive, the charge sharing voltage may be ¾ of AVDD, and when the analog power voltage applied to the data driver is AVDD and a polarity of the pixel is negative, the charge sharing voltage may be ¼ of AVDD.

The method may further include synthesizing the EQ signal to the present line data; and extracting the EQ signal from the present line data.

The EQ signal may be synthesized in a configuration signal area of the present line data.

The EQ signal may be synthesized in a grayscale data area of the present line data.

In an example embodiment of the present invention, a display apparatus includes: a display panel configured to display an image; a timing controller configured to compare a previous line data and a present line data to generate a charge sharing enable (EQ) signal indicating whether or not a charge sharing is to be applied to a pixel; and a data driver configured to selectively apply the charge sharing to the present line data utilizing a charge sharing voltage according to the EQ signal to generate a data voltage and configured to output the data voltage to the pixel.

The data driver may be further configured to apply the charge sharing to the present line data in response to one of the previous line data and the present line data being less than the charge sharing voltage and another one of the previous line data and the present line data being greater than the charge sharing voltage.

The data driver may be further configured to apply the charge sharing to the present line data in response to a difference between the previous line data and the present line data being equal to or greater than a half of a difference between a maximum pixel voltage and a minimum pixel voltage.

The charge sharing voltage may be an average of a maximum pixel voltage and a minimum pixel voltage.

When an analog power voltage applied to the data driver is AVDD and a polarity of the pixel is positive, the charge sharing voltage may be ¾ of AVDD, and when the analog power voltage applied to the data driver is AVDD and a polarity of the pixel is negative, the charge sharing voltage may be ¼ of AVDD.

The timing controller may include: an EQ signal generator configured to compare the previous line data and the present line data to generate the EQ signal; and an interface formatter configured to synthesize the EQ signal to the present line data.

The interface formatter may be configured to synthesize the EQ signal in a configuration signal area of the present line data.

The interface formatter may be configured to synthesize the EQ signal in a grayscale data area of the present line data.

The data driver may include: a buffer configured to output the data voltage to the pixel; a switch coupled to the buffer and configured to selectively apply the charge sharing; and an EQ signal extractor configured to extract the EQ signal from the present line data.

The switch may include: a first switch configured to adjust connection between the buffer and a data line according to the EQ signal; and a second switch configured to adjust providing of the charge sharing voltage to the data line.

The switch may further include: a third switch configured to provide a first charge sharing voltage to a first end portion of the second switch according to a polarity signal; and a fourth switch configured to provide a second charge sharing voltage to the first end portion of the second switch according to the polarity signal.

In an example embodiment of the present invention, in a system of driving a display panel, the system includes: means for comparing a previous line data and a present line data to generate a charge sharing enable (EQ) signal indicating whether or not a charge sharing is to be applied to a pixel; means for selectively applying the charge sharing to the present line data utilizing a charge sharing voltage according to the EQ signal to generate a data voltage; and means for outputting the data voltage to the pixel.

According to the method of driving the display panel and the display apparatus for performing the method in certain example embodiments, a charge sharing (e.g., a charge sharing method) is applied when the data voltage is charged to the pixel. Accordingly, charging rate of the pixel voltage may increase. Thus, display quality of the display panel may be improved.

Whether the charge sharing is applied or not may be determined by comparing a previous line data and a present line data so that unnecessary data toggle may be prevented or reduced. Thus, power consumption and heat of the display apparatus may be reduced.

BRIEF DESCRIPTION OF THE DRAWINGS

The above and other features and aspects of the present invention will become more apparent by describing details of example embodiments with reference to the accompanying drawings, in which.

DETAILED DESCRIPTION

Hereinafter, the present invention will be explained in more detail with reference to the accompanying drawings.

Figure 1:
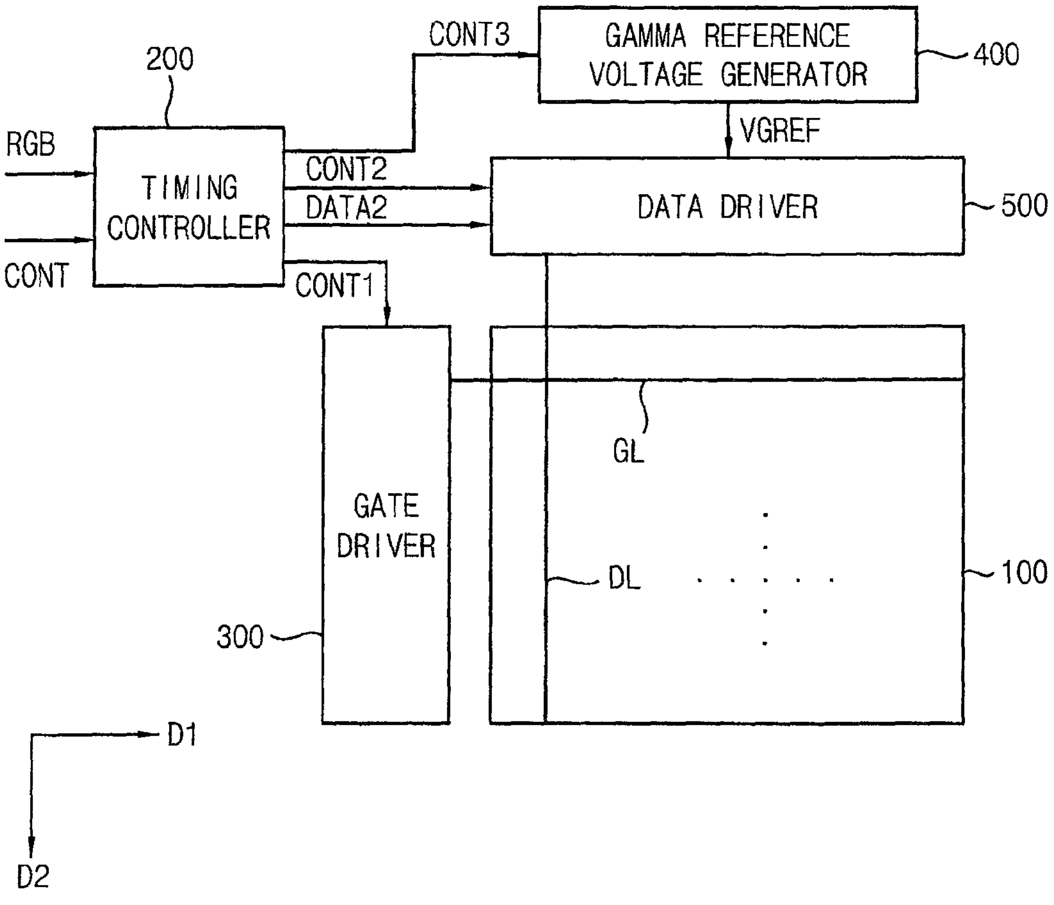
FIG. 1 is a block diagram illustrating a display apparatus according to an example embodiment of the present invention.

FIG. 1 is a block diagram illustrating a display apparatus according to an example embodiment of the present invention.

Referring to FIG. 1, the display apparatus includes a display panel 100 and a panel driver. The panel driver includes a timing controller 200, a gate driver 300, a gamma reference voltage generator 400, and a data driver 500.

The display panel 100 has a display region on which an image is displayed and a peripheral region adjacent to the display region.

The display panel 100 includes a plurality of gate lines GL, a plurality of data lines DL, and a plurality of pixels connected to the gate lines GL and the data lines DL. The gate lines GL extend along a first direction D1 and the data lines DL extend along a second direction D2 crossing the first direction D1.

Each pixel includes a switching element, a liquid crystal capacitor, and a storage capacitor. The liquid crystal capacitor and the storage capacitor are electrically connected or coupled to the switching element. The pixels may be disposed in a matrix form.

The timing controller 200 receives input image data RGB and an input control signal CONT from an external apparatus. The input image data may include red image data R, green image data G, and blue image data B. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA2 based on the input image data RGB and the input control signal CONT.

The timing controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal. The second control signal CONT2 may further include an inverting signal and a charge sharing enable signal (EQ signal).

The timing controller 200 generates the data signal DATA2 based on the input image data RGB. The timing controller 200 outputs the data signal DATA2 to the data driver 500.

The timing controller 200 compares a previous line data and a present line data, and generates the EQ signal which decides whether the charge sharing is applied to the pixel or not.

The timing controller 200 generates the third control signal CONT3 for controlling an operation of the gamma reference voltage generator 400 based on the input control signal CONT, and outputs the third control signal CONT3 to the gamma reference voltage generator 400.

Figure 2:
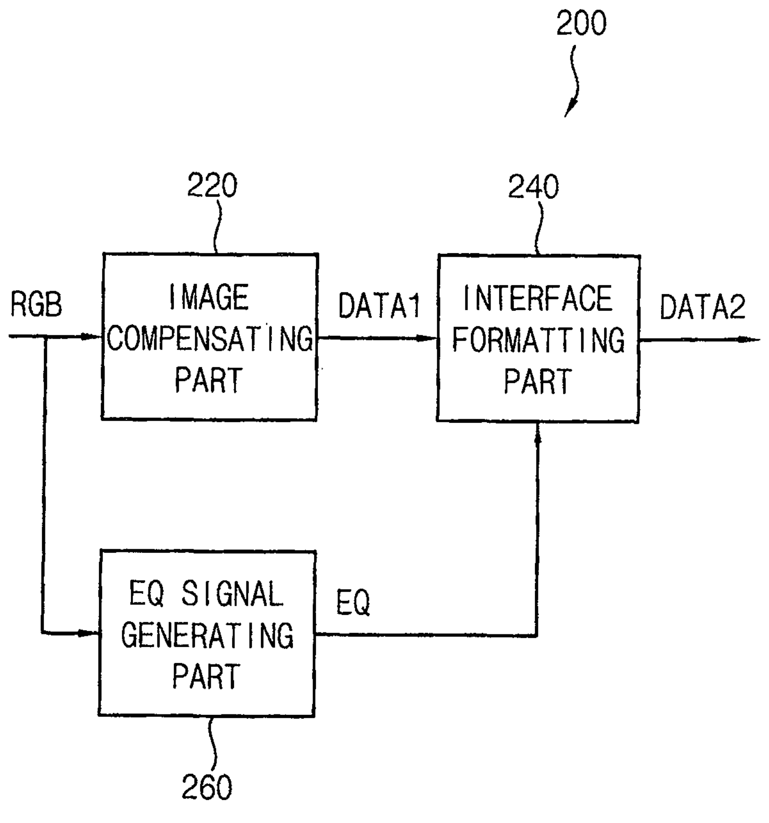
FIG. 2 is a block diagram illustrating a timing controller of FIG. 1.

A structure and an operation of the timing controller 200 are explained referring to FIG. 2 in detail.

The gate driver 300 generates gate signals driving the gate lines GL in response to the first control signal CONT1 received from the timing controller 200. The gate driver 300 sequentially outputs the gate signals to the gate lines GL.

The gate driver 300 may be directly mounted on the display panel 100, or may be connected or coupled to the display panel 100 as a tape carrier package (TCP) type. Alternatively, the gate driver 300 may be integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA2.

In an example embodiment, the gamma reference voltage generator 400 may be incorporated in the timing controller 200, or in the data driver 500.

The data driver 500 receives the second control signal CONT2 and the data signal DATA2 from the timing controller 200, and receives the gamma reference voltages VGREF from the gamma reference voltage generator 400. The data driver 500 converts the data signal DATA2 into data voltages (analog signal or voltage) using the gamma reference voltages VGREF. The data driver 500 outputs the data voltages to the data lines DL.

The data driver 500 may selectively apply the charge sharing to the present line data according to the EQ signal.

The data driver 500 may be directly mounted on the display panel 100, or be connected or coupled to the display panel 100 via a TCP (tape package carrier). Alternatively, the data driver 500 may be integrated on the display panel 100.

A structure and an operation of the data driver 500 are explained in more detail with reference to FIG. 3.

FIG. 2 is a block diagram illustrating the timing controller 200 of FIG. 1.

Referring to FIGS. 1 and 2, the timing controller 200 includes an image compensating part 220, an interface formatting part 240 and an EQ signal generating part 260.

The image compensating part 220 compensates grayscale data of the input image data RGB and rearranges the input image data RGB to generate an intermediate data signal DATA1 to correspond to a data type of the data driver 500. The intermediate data signal DATA1 may be a digital signal. The image compensating part 220 outputs the intermediate data signal DATA1 to the interface formatting part 240.

For example, the image compensating part 220 may include an adaptive color correcting part and a dynamic capacitance compensating part.

The adaptive color correcting part receives the grayscale data of the input image data RGB, and operates an adaptive color correction ("ACC"). The adaptive color correcting part may compensate the grayscale data using a gamma curve.

The dynamic capacitance compensating part operates a dynamic capacitance compensation ("DCC"), which compensates the grayscale data of present frame data using previous frame data and the present frame data.

The EQ signal generating part 260 receives the input image data RGB. The EQ signal generating part 260 compares the previous line data and the present line data and generates the EQ signal which decides whether the charge sharing is applied to the pixel or not according to the previous line data and the present line data.

For example, when one of the previous line data and the present line data is greater than a charge sharing voltage and the other of the previous line data and the present line data is less than the charge sharing voltage, the EQ signal may have a high level. When the charge sharing voltage is between the previous line data and the present line data, the EQ signal may have a high level.

The charge sharing voltage may correspond to an average of a maximum pixel voltage and a minimum pixel voltage. The maximum pixel voltage refers to a pixel voltage representing a maximum grayscale. For example, the maximum pixel voltage may correspond to a white grayscale. The minimum pixel voltage refers to a pixel voltage representing a minimum grayscale. For example, the minimum pixel voltage may correspond to a black grayscale.

For example, when an analog power voltage applied to the data driver 500 is AVDD and a polarity of the pixel is positive, the charge sharing voltage may be ¾ of AVDD.

For example, when the analog power voltage applied to the data driver 500 is AVDD and a polarity of the pixel is negative, the charge sharing voltage may be ¼ of AVDD.

For example, when both of the previous line data and the present line data are greater than the charge sharing voltage, the EQ signal may have a low level.

For example, when both of the previous line data and the present line data are less than the charge sharing voltage, the EQ signal may have a low level.

When the EQ signal has the high level, the data driver 500 applies the charge sharing to the present line data. When the EQ signal has the low level, the data driver 500 does not apply the charge sharing to the present line data.

For each pixel, the charge sharing is applied or not applied. For example, when a previous line data for a first data line is less than the charge sharing voltage and a present line data for the first data line is greater than the charge sharing voltage, the charge sharing is applied to the present line data for the first data line. For example, when a previous line data for a second data line is less than the charge sharing voltage and a present line data for the second data line is less than the charge sharing voltage, the charge sharing is not applied to the present line data for the second data line.

For example, when difference between the previous line data and the present line data is equal to or greater than a half of difference between the maximum pixel voltage and the minimum pixel voltage, the EQ signal may have a high level.

When the charge sharing voltage may correspond to an average of a maximum pixel voltage and a minimum pixel voltage and the difference between the previous line data and the present line data is equal to or greater than a half of difference between the maximum pixel voltage and the minimum pixel voltage, one of the previous line data and the present line data may be less than the charge sharing voltage and the other of the previous line data and the present line data may be greater than the charge sharing voltage.

The EQ signal generating part 260 outputs the EQ signal to the interface formatting part 240. For example, the EQ signal may be a one-bit signal.

The interface formatting part 240 synthesizes the EQ signal with the intermediate data signal DATA1 to generate the data signal DATA2.

The interface formatting part 240 outputs the data signal DATA2 to the data driver 500.

Although not shown in figures, the timing controller 200 may further include a signal generating part.

The signal generating part receives the input control signal CONT. The signal generating part generates the first control signal CONT1 for controlling the driving timing of the gate driver 300. The signal generating part generates the second control signal CONT2 for controlling the driving timing of the data driver 500. The signal generating part generates the first control signal CONT3 for controlling the driving timing of the gamma reference voltage generator 400.

The signal generating part outputs the first control signal CONT1 to the gate driver 300. The signal generating part outputs the second control signal CONT2 to the data driver 500. The signal generating part outputs the third control signal CONT3 to the gamma reference voltage generator 400.

Figure 3:
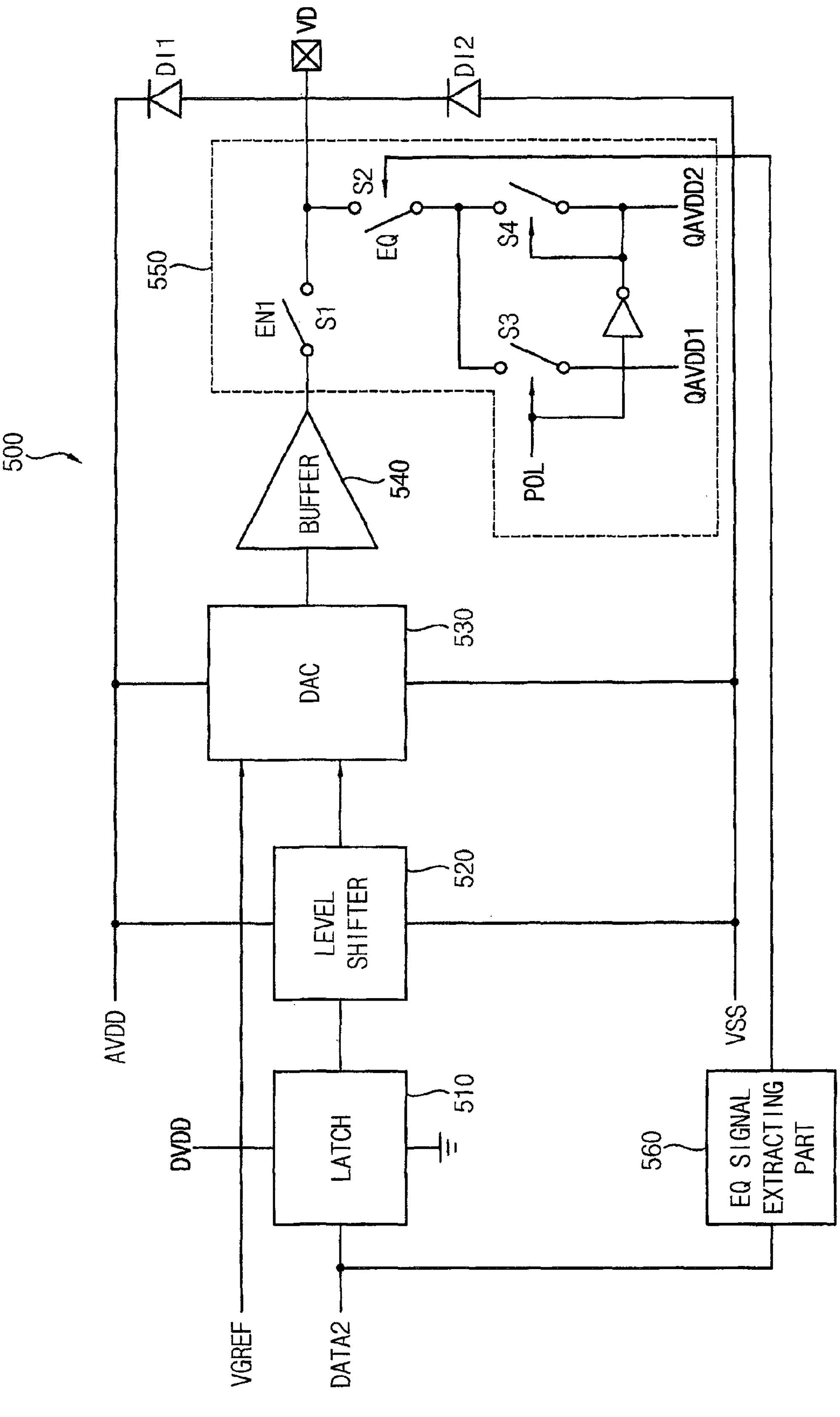
FIG. 3 is a circuit diagram illustrating a data driver of FIG. 1.
Figure 4A:
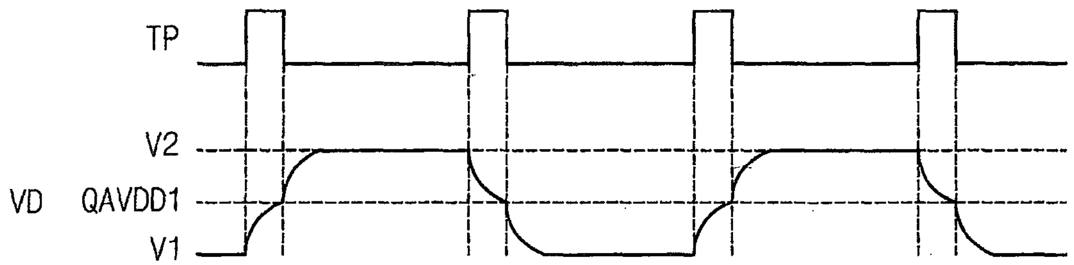
FIGS. 4A and 4B are timing diagrams illustrating data voltages to which a charge sharing is applied without comparing a previous line data and a present line data.
Figure 4B:
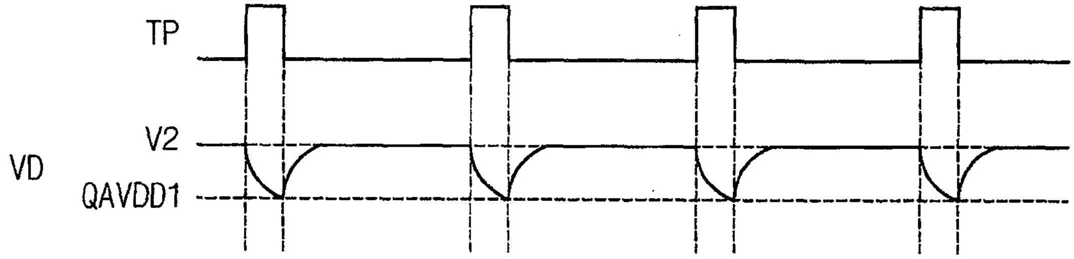
Figure 5A:
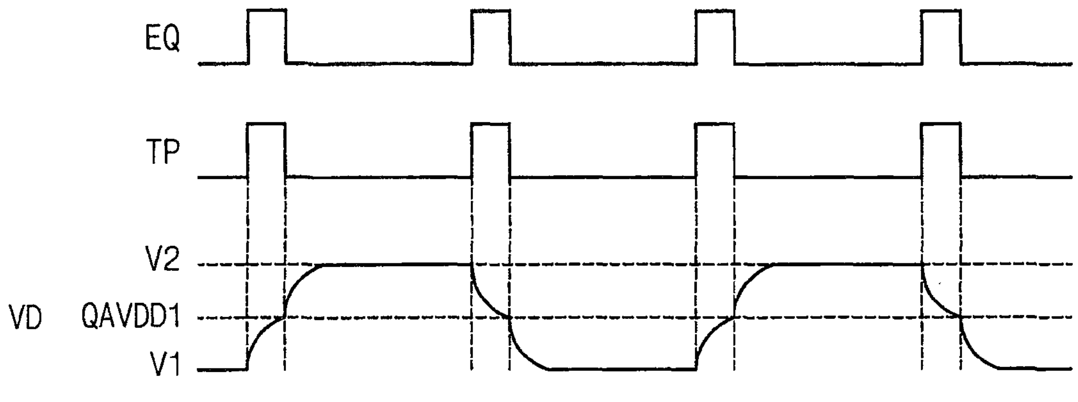
FIGS. 5A and 5B are timing diagrams illustrating data voltages to which a charge sharing is selectively applied according to the previous line data and the present line data.
Figure 5B:
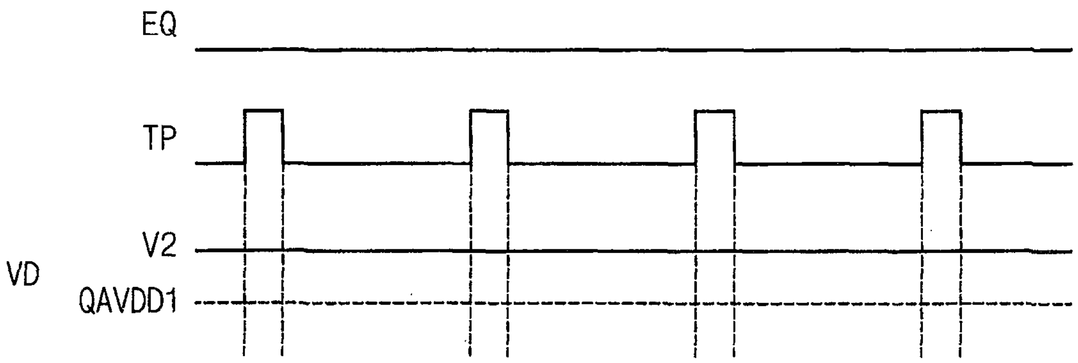
Figure 6:
FIGS. 6 and 7 are conceptual diagrams illustrating present line data signals which are synthesized with EQ signal by the timing controller of FIG. 1.
Figure 7:

FIG. 3 is a circuit diagram illustrating the data driver 500 of FIG. 1. FIGS. 4A and 4B are timing diagrams illustrating data voltages to which a charge sharing is applied without comparing the previous line data and the present line data. FIGS. 5A and 5B are timing diagrams illustrating data voltages to which a charge sharing is selectively applied according to the previous line data and the present line data. FIGS. 6 and 7 are conceptual diagrams illustrating present line data signals which are synthesized with EQ signal by the timing controller 200 of FIG. 1.

Referring to FIGS. 1 to 7, the data driver 500 includes a latch 510, a level shifter 520, a digital to analog converter ("DAC") 530, a buffer 540, a switching part (or switch) 550, and an EQ signal extracting part (or EQ signal extractor) 560. The data driver 500 may further include reverse flow preventing diodes DI1 and DI2.

The latch 510 temporally stores the data signal DATA2 and outputs the data signal DATA2 to the level shifter 520. The latch 510 may be driven by a first power voltage DVDD.

The level shifter 520 may boost the level of the data signal DATA2 outputted from the latch 520. The level shifter 520 may boost the level of the data signal DATA2 using a second power voltage AVDD and a third power voltage VSS. The second power voltage AVDD may be an analog power voltage.

The digital to analog converter 530 receives the data signal DATA2 from the level shifter 520. The digital to analog converter 530 receives the gamma reference voltage VGREF form the gamma reference voltage generator 400.

The digital to analog converter 530 generates the pixel voltage as an analog signal based on the data signal DATA2 and the gamma reference voltage VGREF. The digital to analog converter 530 outputs the pixel voltage to the buffer 540. The digital to analog converter 530 may generate the pixel voltage using the gamma reference voltage VGREF corresponding to the data signal DATA2.

The buffer 540 compensates the pixel voltage to have a uniform level and outputs the pixel voltage to the data line DL. For example, the buffer 540 may include an amplifier.

The switching part 550 is connected or coupled to the buffer 540 to selectively apply the charge sharing. The switching part 550 selectively outputs the pixel voltage which is outputted from the buffer 540 and the charge sharing voltage to the data line DL.

The switching part 550 may selectively output the pixel voltage and the charge sharing voltage to the data line DL according to the EQ signal. For example, when the EQ signal has a high level, the charge sharing voltage is outputted to the data line DL. When the EQ signal has a low level, the pixel voltage is outputted to the data line DL.

The switching part 550 may include a first switch S1 and a second switch S2. The first switch S1 adjusts the connection between the buffer 540 and the data line DL according to the EQ signal. The second switch S2 adjusts the connection for providing the charge sharing voltage to the data line DL.

For example, the first switch S1 may be operated according to an inversion signal EN1 of the EQ signal. The second switch S2 may be operated according to the EQ signal. When the EQ signal has a high level, the first switch S1 is turned off so that the buffer 540 and the data line DL are disconnected. When the EQ signal has a high level, the second switch S2 is turned on so that the charge sharing voltage is provided to the data line DL. When the EQ signal has a low level, the first switch S1 is turned on so that the buffer 540 and the data line DL are connected or coupled. Accordingly, the pixel voltage is outputted from the buffer 540 to the data line DL. When the EQ signal has a low level, the second switch S2 is turned off so that the charge sharing voltage is not provided to the data line DL.

For example, the switching part 550 may further include a third switch S3 and a fourth switch S4. The third switch S3 provides a first charge sharing voltage QAVDD1 to a first end portion of the second switch S2 according to a polarity signal POL. The fourth switch S4 provides a second charge sharing voltage QAVDD2 to the first end portion of the second switch S2 according to the polarity signal POL.

For example, the polarity signal of the pixel represents a positive polarity, the first charge sharing voltage QAVDD1 is transmitted to the first end portion of the second switch S2 through the third switch S3. When the analog power voltage applied to the data driver 500 is AVDD, the first charge sharing voltage QAVDD1 may be ¾ of AVDD. For example, a common voltage may be ½ of AVDD. The positive pixel voltages may have a level between the ½ of AVDD and AVDD.

For example, the polarity signal of the pixel represents a negative polarity, the second charge sharing voltage QAVDD2 is transmitted to the first end portion of the second switch S2 through the fourth switch S4. When the analog power voltage applied to the data driver 500 is AVDD, the second charge sharing voltage QAVDD2 may be ¼ of AVDD. For example, a common voltage may be ½ of AVDD. The negative pixel voltages may have a level between the 0 and ½ of AVDD.

The first reverse flow preventing diode DI1 is arranged between an output terminal VD of the data driver 500 and a second power voltage terminal AVDD. The first reverse flow preventing diode DI1 may prevent the second power voltage AVDD from flowing to the output terminal VD of the data driver 500.

The second reverse flow preventing diode DI2 is arranged between the output terminal VD of the data driver 500 and a third power voltage terminal VSS. The second reverse flow preventing diode DI2 may prevent the data voltage VD from flowing to the third power voltage terminal VSS.

The EQ signal extracting part 560 extracts the EQ signal from the data signal DATA2. The EQ signal extracting part 560 outputs the EQ signal to the switching part 550. For example, the EQ signal may be applied to the second switch S2, and the inversion signal EN1 of the EQ signal may be applied to the first switch S1.

FIGS. 4A and 4B are timing diagrams illustrating the charge sharing driving method when the first and second switches S1 and S2 are not operated.

In FIGS. 4A and 4B, for example, the polarity of the pixel is positive and the charge sharing voltage is the first charge sharing voltage QAVDD1. During a high duration of the load signal TP, the first charge sharing voltage QAVDD1 is applied to the pixel. From a falling edge of the load signal TP, the pixel voltage corresponding to the grayscale of the pixel is applied to the pixel.

In FIG. 4A, the pixel voltage outputted to the data line DL swings between a high level V2 and a low level V1. For example, the high level V2 of the pixel voltage may be the maximum pixel voltage. For example, the low level V1 of the pixel voltage may be the minimum pixel voltage. The display panel 100 may display a horizontal line inversion pattern with the above pixel voltages. In the horizontal line inversion pattern, the data voltage VD repetitively swings between the maximum level and the minimum level so that power consumption and heat may increase.

In addition, display quality of the display panel 100 may decrease due to a low charging rate of the pixel voltage.

When the pixel voltage increases from the low level V1 to the high level V2, the first charge sharing voltage QAVDD1 is applied to the data line DL during the high duration of the load signal TP. Accordingly, after the falling edge of the load signal TP, the voltage of the high level V2 may be rapidly applied to the pixel.

When the pixel voltage increases from the high level V2 to the low level V1, the first charge sharing voltage QAVDD1 is applied to the data line DL during the high duration of the load signal TP. Accordingly, after the falling edge of the load signal TP, the voltage of the low level V1 may be rapidly applied to the pixel.

When the pixel voltage is increased or decreased by connecting or coupling the data line DL to the charge sharing terminal to which the charge sharing voltage QAVDD1 having the DC level is applied, the power consumption and heat of the data driver 500 may be reduced.

In addition, the charging rate of the pixel may be increased due to the charge sharing so that the display quality of the display panel 100 may be improved.

In FIG. 4B, the pixel voltage outputted to the data line DL maintains the high level V2. For example, the high level V2 of the pixel voltage may be the maximum pixel voltage. When the charge sharing is not applied to the display panel 100 in this pattern, the data voltage VD maintains the maximum level so that power consumption and heat may be maintained relatively low.

However, when the charge sharing is applied to the display panel 100 in this pattern, the data voltage having the high level V2 is periodically fallen toward the first charge sharing voltage QAVDD1 corresponding to the high duration of the load signal TP, so that the unnecessary power consumption and heat may be generated.

Referring to FIG. 5A, when the charge sharing is necessary to be applied to the pixel like the pattern in FIG. 4A, the EQ signal has a high level. The EQ signal generating part 260 compares the previous line data and the present line data and generates the EQ signal having the high level. A high duration of the EQ signal may be substantially the same as the high duration of the load signal TP.

Thus, as explained referring to FIG. 4A, during the high duration of the load signal TP, the first charge sharing voltage QAVDD1 is applied to the data line DL so that the power consumption and the heat may be reduced. In addition, the charging rate of the pixel voltage is improved so that the display quality of the display panel 100 may be improved.

Referring to FIG. 5B, when the charge sharing is unnecessary to be applied to the pixel like the pattern in FIG. 4B, the EQ signal has a low level. The EQ signal generating part 260 compares the previous line data and the present line data and generates the EQ signal having the low level.

Thus, unlike explanation referring to FIG. 4B, during the high duration of the load signal TP, the first charge sharing voltage QAVDD1 is not applied to the data line DL so that instances of increased or high power consumption and heat may be prevented or reduced. In addition, the charging rate of the pixel voltage is maintained so that the display quality of the display panel 100 may be improved.

In FIGS. 6 and 7, an example data structure of the data signal DATA2 outputted from the timing controller 200 to the data driver 500 is illustrated. The data structure in FIGS. 6 and 7 represents a single line data corresponding to a single gate line.

The line data of the data signal DATA2 includes a start of line area SOL, a configuration signal area CONFIG, a grayscale data area PIXEL DATA which includes pixel grayscale values and a horizontal blank area HBP.

As shown in FIG. 6, the EQ signal, which decides whether the charge sharing is applied to the pixel or not, may be synthesized in the configuration signal area CONFIG. The configuration signal area may further include the polarity signal POL.

As shown in FIG. 7, the EQ signal, which decides whether the charge sharing is applied to the pixel or not, may be synthesized in the grayscale data area PIXEL DATA of the present line data signal.

According to the method of driving the display panel and the display apparatus for performing the method, a charge sharing is selectively applied to the display panel by comparing the previous line data and the present line data so that the power consumption and heat of the display apparatus may be reduced. In addition, the charge rate of the pixel voltage may be improved, and the display quality of the display panel may be improved The foregoing is illustrative of the present invention and is not to be construed as limiting thereof. Although a some example embodiments of the present invention have been described, those skilled in the art will readily appreciate that many modifications are possible in the example embodiments without materially departing from the novel teachings and aspects of the present invention. Accordingly, all such modifications are intended to be included within the scope of the present invention as defined in the claims, and their equivalents.

In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of driving a display panel, the method comprising:

comparing a previous line data and a present line data with at least one of a charge sharing voltage, a maximum pixel voltage, and a minimum pixel voltage to generate a charge sharing enable (EQ) signal indicating whether or not a charge sharing is to be applied to a pixel;

selectively applying the charge sharing to the present line data utilizing the charge sharing voltage according to the EQ signal to generate a data voltage; and outputting the data voltage to the pixel.

2. The method of claim 1, further comprising applying the charge sharing to the present line data in response to one of the previous line data and the present line data being less than the charge sharing voltage and another of the previous line data and the present line data being greater than the charge sharing voltage.

3. The method of claim 1, further comprising applying the charge sharing to the present line data in response to a difference between the previous line data and the present line data being equal to or greater than a half of a difference between the maximum pixel voltage and the minimum pixel voltage.

4. The method of claim 1, wherein the charge sharing voltage is an average of the maximum pixel voltage and the minimum pixel voltage.

5. The method of claim 4, wherein when an analog power voltage applied to a data driver is AVDD and a polarity of the pixel is positive, the charge sharing voltage is ¾ of AVDD, and when the analog power voltage applied to the data driver is AVDD and a polarity of the pixel is negative, the charge sharing voltage is ¼ of AVDD.

6. The method of claim 1, further comprising:

synthesizing the EQ signal to the present line data; and extracting the EQ signal from the present line data.

7. The method of claim 6, wherein the EQ signal is synthesized in a configuration signal area of the present line data.

8. The method of claim 6, wherein the EQ signal is synthesized in a grayscale data area of the present line data.

9. A display apparatus comprising:

a display panel configured to display an image;

a timing controller configured to compare a previous line data and a present line data with at least one of a charge sharing voltage, a maximum pixel voltage, and a minimum pixel voltage to generate a charge sharing enable (EQ) signal indicating whether or not a charge sharing is to be applied to a pixel; and a data driver configured to selectively apply the charge sharing to the present line data utilizing the charge sharing voltage according to the EQ signal to generate a data voltage and configured to output the data voltage to the pixel.

10. The display apparatus of claim 9, wherein the data driver is further configured to apply the charge sharing to the present line data in response to one of the previous line data and the present line data being less than the charge sharing voltage and another one of the previous line data and the present line data being greater than the charge sharing voltage.

11. The display apparatus of claim 9, wherein the data driver is further configured to apply the charge sharing to the present line data in response to a difference between the previous line data and the present line data being equal to or greater than a half of a difference between the maximum pixel voltage and the minimum pixel voltage.

12. The display apparatus of claim 9, wherein the charge sharing voltage is an average of the maximum pixel voltage and the minimum pixel voltage.

13. The display apparatus of claim 12, wherein when an analog power voltage applied to the data driver is AVDD and a polarity of the pixel is positive, the charge sharing voltage is ¾ of AVDD, and when the analog power voltage applied to the data driver is AVDD and a polarity of the pixel is negative, the charge sharing voltage is ¼ of AVDD.

14. The display apparatus of claim 9, wherein the timing controller comprises:

an EQ signal generator configured to compare the previous line data and the present line data to generate the EQ signal; and an interface formatter configured to synthesize the EQ signal to the present line data.

15. The display apparatus of claim 14, wherein the interface formatter is configured to synthesize the EQ signal in a configuration signal area of the present line data.

16. The display apparatus of claim 14, wherein the interface formatter is configured to synthesize the EQ signal in a grayscale data area of the present line data.

17. The display apparatus of claim 14, wherein the data driver comprises:

a buffer configured to output the data voltage to the pixel;

a switch coupled to the buffer and configured to selectively apply the charge sharing; and an EQ signal extractor configured to extract the EQ signal from the present line data.

18. The display apparatus of claim 17, wherein the switch comprises:

a first switch configured to adjust connection between the buffer and a data line according to the EQ signal; and a second switch configured to adjust providing of the charge sharing voltage to the data line.

19. The display apparatus of claim 18, wherein the switch further comprises:

a third switch configured to provide a first charge sharing voltage to a first end portion of the second switch according to a polarity signal; and a fourth switch configured to provide a second charge sharing voltage to the first end portion of the second switch according to the polarity signal.

20. A system of driving a display panel, the system comprising:

means for comparing a previous line data and a present line data with at least one of a charge sharing voltage, a maximum pixel voltage, and a minimum pixel voltage to generate a charge sharing enable (EQ) signal indicating whether or not a charge sharing is to be applied to a pixel;

means for selectively applying the charge sharing to the present line data utilizing the charge sharing voltage according to the EQ signal to generate a data voltage; and means for outputting the data voltage to the pixel.

* * * * *